J. G. CHERRY.

CAN FOR TRANSPORTING MILK OR CREAM.

No. 9,811. Reissued July 19, 1881.

Witnesses
Wm Zimmerman.
Wm R. Tourall

Inventor
John G. Cherry.
By Bridley & Co
Attys.

N. PETERS, Photo-Lithographer, Washington, D. C.

UNITED STATES PATENT OFFICE.

JOHN G. CHERRY, OF CEDAR RAPIDS, IOWA.

CAN FOR TRANSPORTING MILK OR CREAM.

SPECIFICATION forming part of Reissued Letters Patent No. 9,811, dated July 19, 1881.

Original No. 222,814, dated December 23, 1879. Application for reissue filed June 24, 1881.

*To all whom it may concern:*

Be it known that I, JOHN G. CHERRY, of Cedar Rapids, in the county of Linn and State of Iowa, have invented certain new and useful Improvements in Cans for Transporting Milk and Cream; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in that class of cans for transporting milk or cream which have for their object to provide suitable means for preventing the overflow or spilling of the contents while being transported from one place to another; and it consists in the construction and general arrangement of parts, as hereinafter more fully described and claimed.

Figure 1:
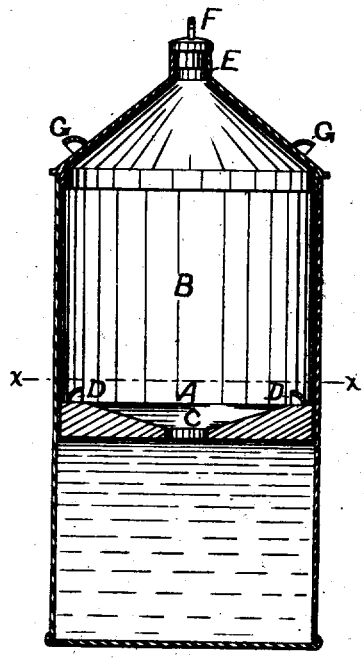
Figure 2:
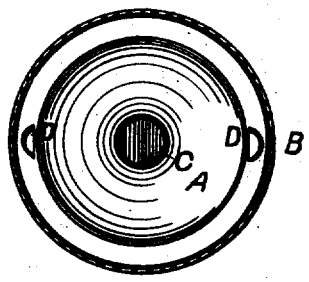

Referring to the drawings, Figure 1 is a vertical longitudinal section of my improved can, and Fig. 2 a transverse section of the same, taken on the line *x x* of Fig. 1.

Similar letters of reference indicate like parts.

B represents the body of a milk-can of the usual construction, which I provide with a raised top or cover having an opening or orifice, E. Within the can, and smoothly adjusted therein, I provide a light wooden or metallic float, A, the top of which is concave, having an opening, C, extending through the same.

D D represent suitable handles for removing the float from the can.

The construction of the can being as described, it will be observed that in the operation of the same the milk or cream is poured through the opening E of the raised cover down upon the float A, from whence it finds its way through the opening C in the float to the bottom of the can, causing said float to rise in the can to a height proportionate to the amount of milk or cream contained in the can.

In the transportation of milk or cream from one place to another the float A, resting lightly upon the surface of the contents of the can, prevents the splashing or flowing over of the milk or cream by reason of the contents gushing up through the opening C upon the concave top, from whence it returns again to the under surface of the float through the same opening; and as the contents of the can rise and fall through the float A the animal heat contained in the cream or milk is given off and passes out through the opening E in the cover of the can, enabling the contents of the can to be delivered in good condition.

Having thus described my invention, what I claim as new, and desire to secure by Letters Patent, is—

1. The herein-described can for transporting milk or cream, consisting of the body B, having raised cover, provided with opening E, and float A, having concave top and opening C, substantially as and for the purpose specified.

2. The combination of the float A, having concave top, provided with handles D and opening C, with the can B, and raised cover having opening E, substantially as and for the purpose specified.

3. The combination, with the body B, of the float A, having concave top and opening C, substantially as and for the purpose specified.

JOHN G. CHERRY.

Witnesses:
WM. ZIMMERMAN,
N. COWLES.